(12) United States Patent
Willins et al.

(10) Patent No.: US 6,899,271 B2
(45) Date of Patent: May 31, 2005

(54) ARRANGEMENT FOR AND METHOD OF COLLECTING AND DISPLAYING INFORMATION IN REAL TIME ALONG A LINE OF SIGHT

(75) Inventors: Bruce A. Willins, East Northport, NY (US); Miklos Stern, Woodmede, NY (US); Dmitriy Yavid, Stony Brook, NY (US); Frederick F. Wood, Medford, NY (US); Chinh Tan, Setauket, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 51 days.

(21) Appl. No.: 10/429,446

(22) Filed: May 5, 2003

(65) Prior Publication Data

US 2004/0222301 A1 Nov. 11, 2004

(51) Int. Cl.⁷ .................................................. G06K 7/10
(52) U.S. Cl. ................................................. 235/462.01
(58) Field of Search ....................... 235/462.01; 353/11, 353/42–44, 119; 345/30

(56) References Cited

U.S. PATENT DOCUMENTS 6,327,570 B1 * 12/2001 Stevens .......................... 705/7
6,655,597 B1 * 12/2003 Swartz et al. ........... 235/462.45

FOREIGN PATENT DOCUMENTS

DE         29814503 U1 * 11/1998 ............ H04N/1/04

OTHER PUBLICATIONS

K.Y. Lau, "MEM's the Word for Optical Beam Manipulation", Jul. 1997, IEEE Circuits and Devices Magazine vol. 13, Issue 4, pp. 11–18.*

* cited by examiner

Primary Examiner—Thien M. Le
Assistant Examiner—Lisa M. Caputo
(74) Attorney, Agent, or Firm—Kirschstein, et al.

(57) ABSTRACT

An arrangement for and a method of collecting and displaying information in real time along a line of sight from a human operator to remote targets located at variable distances therefrom and identifiable by machine-readable indicia. A two-dimensional image is automatically projected along the line of sight on the target alongside the indicia while maintaining the image size relatively constant over an extended range of working distances.

17 Claims, 5 Drawing Sheets

ARRANGEMENT FOR AND METHOD OF COLLECTING AND DISPLAYING INFORMATION IN REAL TIME ALONG A LINE OF SIGHT

BACKGROUND OF THE INVENTION

1. Field of the Invention

The present invention generally relates to an electro-optical arrangement for and method of collecting and displaying information in real time along a line of sight from a human operator to remote targets located at variable distances therefrom and identifiable by machine-readable indicia and, more particularly, to automatically displaying a two-dimensional image on each target adjacent its indicia along the line of sight while maintaining a size of the image relatively constant over an extended range of the distances.

2. Description of the Related Art

It is generally known to project a two-dimensional image on a screen based on a pair of scan mirrors which oscillate in mutually orthogonal directions to scan a laser beam over a raster pattern. However, the known image projection systems have limited resolution, typically less than a fourth of video-graphics-array (VGA) quality of 640×480 pixels. Also, the image produced by the known projection systems is typically only sharp and clear at a single distance, or at most, a limited range of distances, away from the systems. The physical size and power consumption of the known projection systems are relatively high, thereby rendering them impractical for use in miniature, battery-operated, operator-wearable, hand-held or finger-supported applications.

It is also generally known to display an image on a screen of a data collection terminal worn on an operator's wrist or belt. Data is entered in such wrist- or belt- worn terminals, either manually by keyboard entry, or automatically by an electro-optical reader mounted on the back of one or more of the operator's fingers. The data captured by the reader is sent by wired or wireless link to the terminal, and information corresponding to the captured data is displayed on the terminal screen, typical a liquid crystal display (LCD) device. See, for example, U.S. Pat. No. 5,578,810; No. 5,410,140; No. 5,543,610 and No. D-391,250, for examples of known finger-mounted optical readers.

Experience has shown, however, that the known data collection systems that employ a wrist- or belt- worn terminal coupled to a finger-mounted reader are not altogether satisfactory due to the requirement that the operator has to repeatedly redirect his/her line of sight during use. Under normal operation, the operator initially directs his/her eyes along a line of sight to indicia, such as a bar code symbol, typically printed on a label affixed to a target, such as a parcel to be delivered. The operator aims the reader at the symbol, initiates a scan, and then waits for auditory or visual confirmation that the symbol has been successfully read.

The system then processes the data collected by the reader and typically displays information related to the processed data on the terminal. Since the terminal is mounted, as previously described, on one's wrist or belt, the operator must turn his/her head, or at least redirect the focus of his/her eyes along a different light of sight in order to see the displayed information on their wrist or belt. When performing multiple repeated scans of successive symbols on successive targets, this constant redirection of one's eyes slows productivity and causes discomfort.

SUMMARY OF THE INVENTION

OBJECTS OF THE INVENTION

Accordingly, one object of this invention is to collect and automatically display information in real time along a line of sight from a human operator to a remote target.

Another object of this invention is to reduce, if not eliminate, the requirement for an operator to shift his/her gaze during data collection and display.

Still another object of this invention is to improve productivity and reduce operator discomfort during use of data collection and display arrangements.

FEATURES OF THE INVENTION

In keeping with the above objects and others which will become apparent hereinafter, one feature of the present invention resides, briefly stated, in an arrangement for, and a method of, collecting and displaying information in real time along a line of sight from a human operator to remote targets located at variable distances therefrom. Each target is identifiable by a machine-readable indicium associated therewith. For example, the indicium may be a one-or two-dimensional bar code symbol printed on a label that is adhered to a parcel to be delivered. The symbol identifies the parcel, and the operator may be a commercial courier whose job is to pick up and deliver the parcel, as well as to read the symbol and enter its encoded data into a tracking network so that the parcel can be tracked during delivery.

The operator initiates reading of the symbol by looking at the symbol, aiming an electro-optical reader at the symbol, and manually actuating the reader. During these actions, the operator's gaze is directly on the symbol to insure that light emitted, or captured, by the reader is directed to, or reflected off, the symbol. The reader processes data read from the symbol and retrieves information for display. The retrieved information can be a price obtained from a look-up table, an inventory number obtained from a database and, in short, any information which it is desired for the operator to know at the time of data collection.

The reader, or at least major components thereof, is contained in a portable housing supported by the operator. For example, the housing can include a ring mount for supporting the housing on the back of one or more of the operator's fingers.

Also contained in the housing is an image projector. The projector includes a light source, for example, a solid-state laser for emitting a laser beam, a scanner for sweeping the light beam in a pattern of scan lines on the target, each scan line having a number of pixels, and a controller for choosing selected pixels in the pattern based on the data obtained by the reader, and for causing the selected pixels to be illuminated and rendered visible by the laser beam, thereby producing a two-dimensional image on the target adjacent the symbol on the target.

In accordance with one aspect of this invention, the projection of the image on the target automatically occurs after reading of the symbol and, in order to view the image, the operator need not avert his/her gaze. During data collection and display, the operator need never move his/her head or eyes, or change their point of view, which is always directed to the target. This feature improves productivity and operator comfort.

Still another feature of this invention resides in controlling the size of the image over an extended range of distances between the target and the housing. Thus, a target may be several inches, or many feet, away from the housing supported by the operator. A projected image increases in area as a function of increasing distance from the projector, and vice versa. In some cases, the image may be too small for a close-in target, or too big for a far-out target. The operator typically moves his/her hand toward and away from the target to obtain an image more amenable to be easily viewed.

This invention provides a rangefinder for determining the distance of the target, and for controlling the size of the image based on the determined distance. Preferably, the size of the image is kept relatively constant over an extended range of distances in which the targets may be located. A constant image size provides the operator with a constant viewing experience and avoids the hand movements described above which, over time, leads to operator fatigue. The rangefinder can be mounted on the housing. It is also possible to have a prior knowledge of the size of the indicia being read and to use that information to determine distance.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
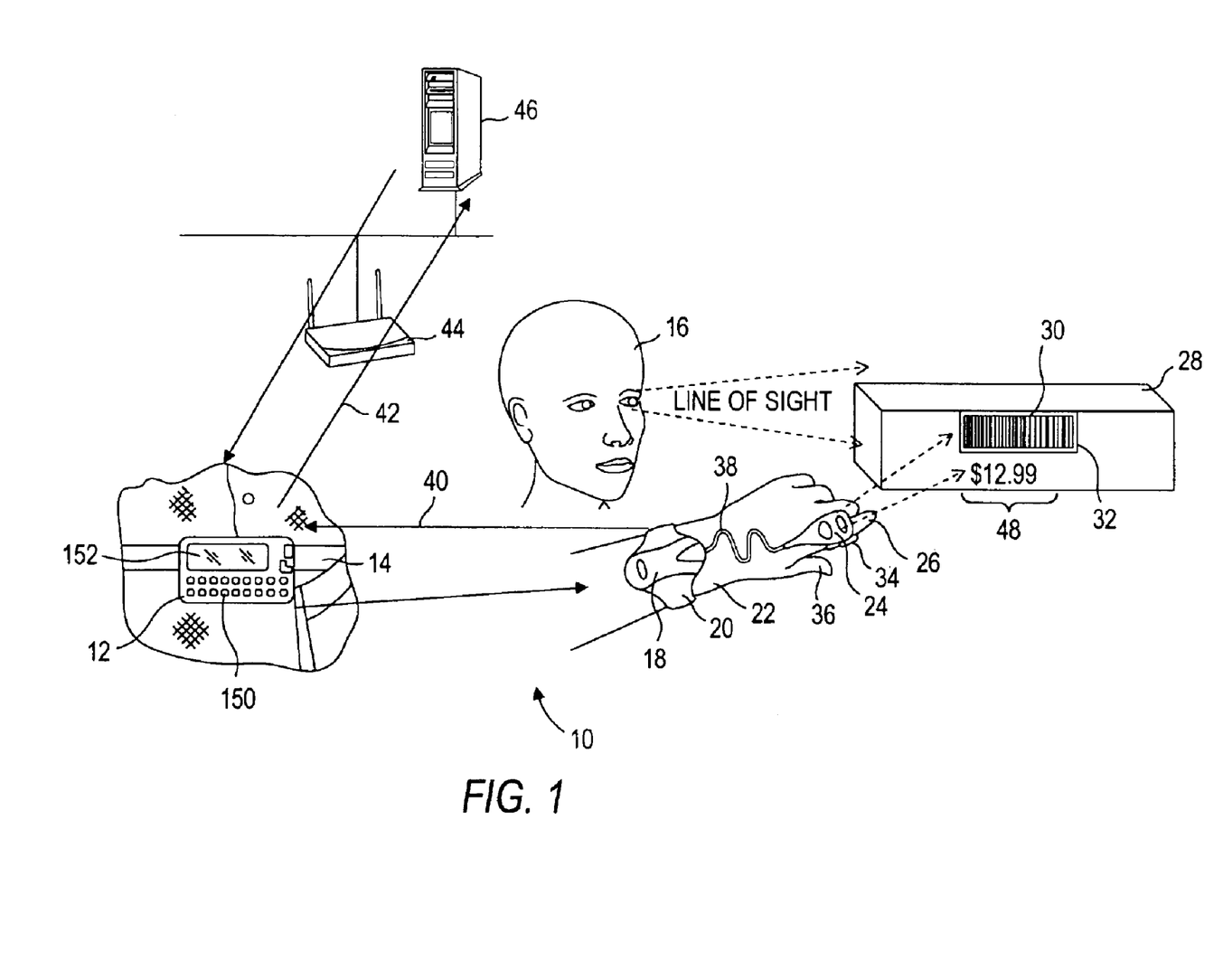
FIG. 1 is a perspective view of a data collection and display system according to this invention.

Reference numeral 10 generally identifies a data collection and display system according to this invention. System 10 includes a mobile terminal 12 worn on a belt 14 of an operator 16, a wrist-worn peripheral 18 including a wrist strap 20 worn around a wrist 22 of the operator 16, and a finger-mounted housing 24 mounted on a forefinger 26 of the operator 16.

As explained in detail below, the operator 16 directs his eyes along a line of sight, points his outstretched forefinger 26, and aims the housing 24, at a target 28, for example, a shipping carton, on which an indicium, for example, a two-dimensional bar code symbol 30, is printed on a label 32 adhered to the carton 28. The operator then manually actuates an electro-optical reader mounted in the housing 24 by manually depressing a trigger 34 with his thumb 36. The reader reads and processes the symbol, and passes processed information to the peripheral 18 by means of a cable 38. The peripheral 18, in turn, passes the processed information to the terminal 12 by a wireless link 40, for example, using a short-haul protocol, such as Bluetooth™ The terminal 12, in turn, forwards the received information over another wireless link 42 to a wireless router 44 via an IEEE 802.11 protocol. The router 44, in turn, forwards the information to a wired server 46 which accesses a database or lookup table and retrieves information therefrom for display to the operator. The server 46 sends this retrieved information to the router 44, the terminal 12, the peripheral 18 and to an image projector in the finger-mounted housing 24. The image projector, as detailed below, projects a two-dimensional image 48, for example, the price: "$12.99" on the carton 28 adjacent the symbol 30. This image 48 is visible to the operator who need not turn his/her head, or change his/her gaze or line of sight to read the image. The operator's attention is always on the carton, thereby improving operator productivity and comfort.

Figure 2:
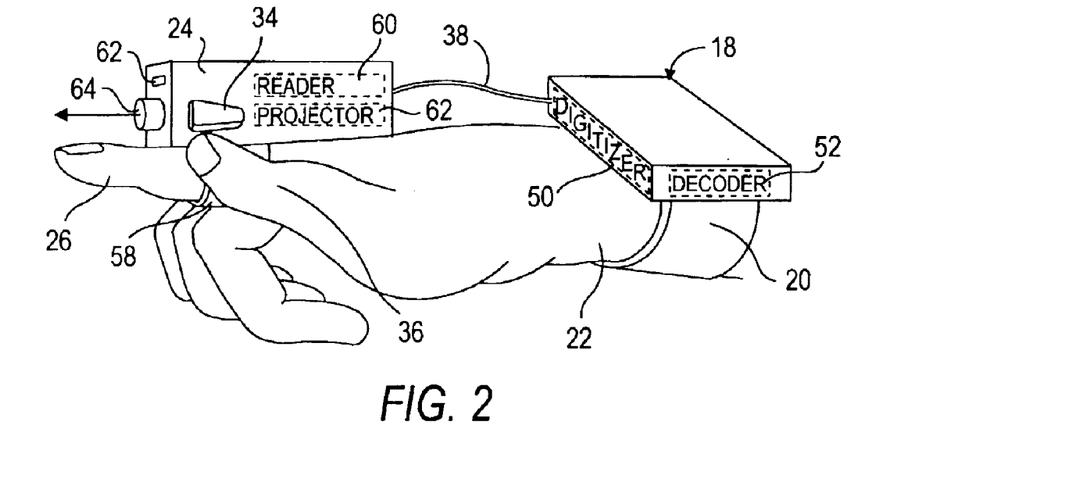
FIG. 2 is a perspective view of one embodiment of a finger-mounted housing for use in the system of FIG. 1.
Figure 3:
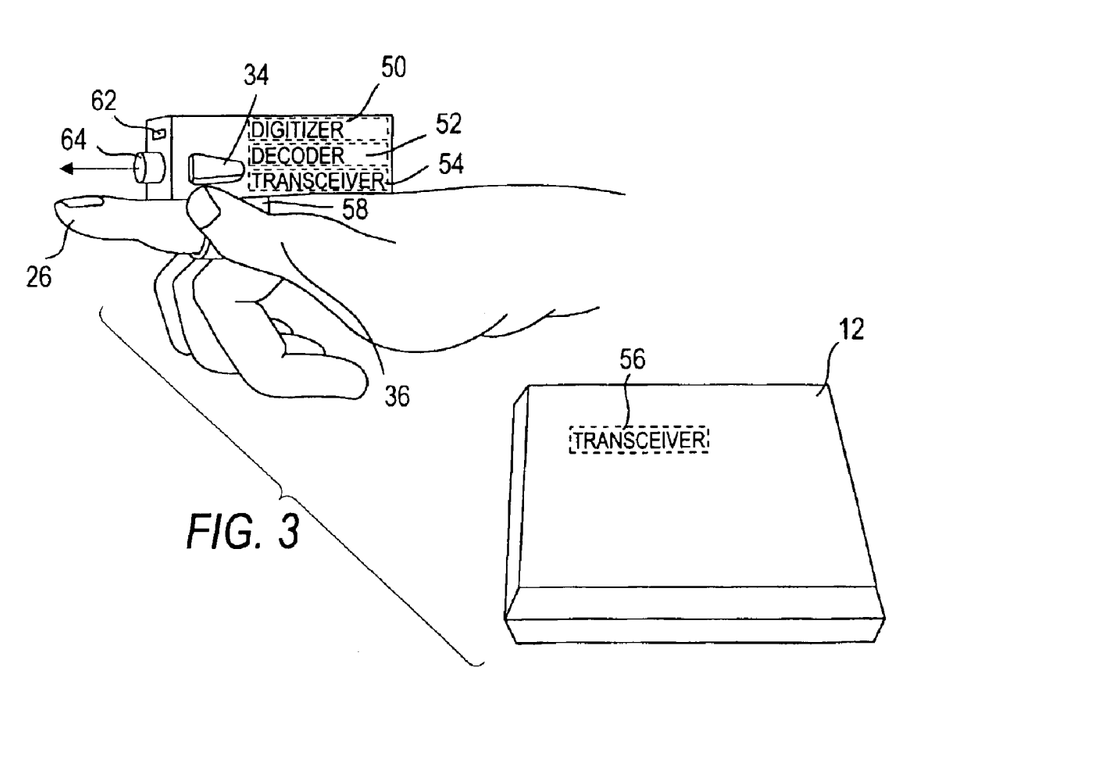
FIG. 3 is a perspective view of another embodiment of a finger-mounted housing for use in the system of FIG. 1.
Figure 4:
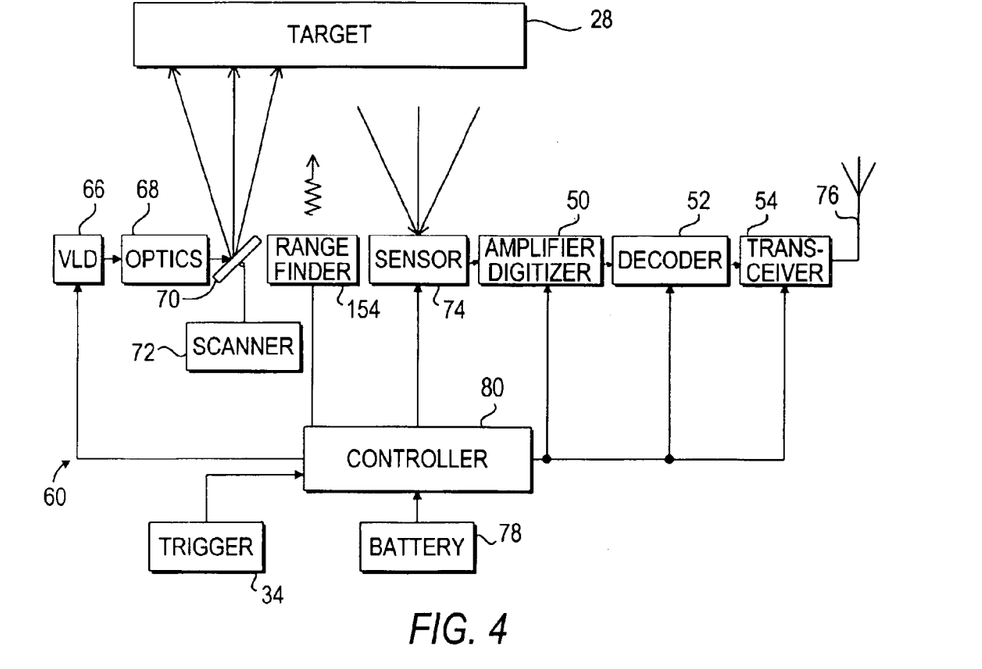
FIG. 4 is a block diagram of a reader for use in the system of FIG. 1.
Figure 5:
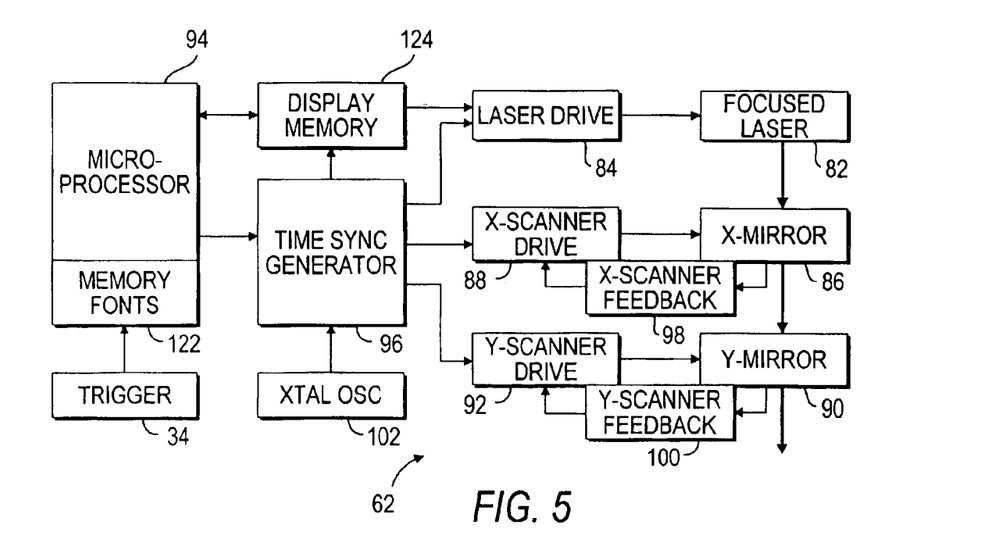
FIG. 5 is a block diagram of an image projector for use in the system of FIG. 1.

FIG. 2 depicts the housing 24 on the outstretched finger 26. An electro-optical reader 60 and an image projector 62, or at least major components thereof, are mounted in the housing 24. FIG. 4 depicts circuit components of the reader 60. FIG. 5 depicts circuit components of the projector 62. As explained below, the reader generates an analog signal indicative of the variable intensity of light received from the symbol. This analog signal is digitized by a digitizer 50 and then decoded by a decoder 52. In FIG. 2, the analog signal is conducted along the cable 38 to the peripheral 18 in which the digitizer 50 and decoder 52 are contained. In FIG. 3, the digitizer 50 and the decoder 52 are contained within the housing 24, thereby eliminating the cable 38 and the peripheral 18. A wireless transceiver 54 in the housing 24 is used to communicate with a corresponding transceiver 56 in the terminal 12. FIGS. 2 and 3 both show a ring mount 58 for mounting the housing on a finger of the operator. The housing 24 includes a pair of light-transmissive windows 62, 64, one for the reader, and the other for the projector, although it is possible to incorporate both windows 62, 64 into a single window, as described below.

Before turning to the block diagrams of FIGS. 4–5, it should be mentioned that many variants of the system 10 are possible. As previously described, the cable 38 and the peripheral 18 could be eliminated. The housing 24 itself need not be finger-mounted, but could be held in one's hand like a pen, a gun, a flashlight, or a personal digital assistant, or could be supported by another part of the operator's body, or could be worn on one's clothing or body as, for example, incorporated into eyeglasses or a helmet. The wired or wireless links between the terminal, router and server could be changed and, indeed, in some applications one or more of these pieces of equipment could be eliminated.

Referring now to FIG. 4, the reader 60 includes a light source, such as a solid-state, visible laser diode 66 operative for directing a laser beam through focusing optics 68 to a scan mirror 70 oscillatable by a scanner 72 to sweep the laser beam through the window 62 on and across the indicia 30 on the target 28. The illustrated arrangement generates a single scan line extending in one direction across the symbol which is suitable for reading one-dimensional symbols, such as UPC symbols. A second scan mirror and scanner can be employed to generate a pattern of scan lines arranged along a second direction perpendicular to said one direction, the pattern being suitable for reading two-dimensional symbols.

Light reflected off the symbol is detected by a sensor 74, for example, a photodiode, operative for generating an electrical analog signal indicative of the detected intensity of the light reflected from the symbol. This analog signal, as previously mentioned, is digitized in the digitizer 50, decoded in the decoder 52, and sent by the transceiver 54 to an antenna 76, all under control of a controller 80, e.g., a programmed microprocessor. A battery 78, preferably rechargeable, is used to supply electrical power to all the electronic components in the housing 24. The trigger 34 is connected to the controller 80.

The reader 60 thus generates a decoded signal which identifies the target or some characteristic thereof. The system employs this identifying signal to access a database or look-up table to retrieve some information corresponding to the identifying signal. This could be a shipping price, or an amount of goods in inventory, or the like. This retrieved information is sent back by the system to the projector 62 for the purpose of displaying the retrieved information.

Before turning to FIG. 5, it should be mentioned that the reader need not employ a laser 66 and photodiode 74, as is used in moving beam readers, but could be an imager in which a charge-coupled device (CCD) array, or similar two-dimensional array, is used to image the symbol, and then to decode the symbol based on analysis of the image.

The image projector 62 of FIG. 5 includes a light source such as a laser 82 energized by a drive 84 to emit a laser beam to a first X-mirror 86 oscillatable by an X-drive 88 for horizontally moving the laser beam back and forth at a first sweep frequency $f_h$ along a first direction, commonly termed "X-axis" sweeping, and, in turn, to a second Y-mirror 90 oscillatable by a Y-drive 92 for vertically moving the laser beam up and down at a second sweep frequency $f_v$ along a second direction, commonly termed "Y-axis" sweeping. The first and second directions are mutually orthogonal. The first or horizontal sweep frequency is generally much faster than the second or vertical sweep frequency. In the preferred embodiment, $f_v \geq 40$ Hz and $f_h \geq 3.8$ kHz or $n(f_v)$ where n is the number of pixels within one horizontal sweep.

A control processor 94 is operative for controlling a time synchronizing generator 96 which, in turn, controls the X-drive 88 and the Y-drive 92 to insure that the X-mirror 86 and the Y-mirror 90 oscillate at the correct speeds. An X-scanner feedback circuit 98 and a Y-scanner feedback circuit 100 monitor the sweep frequencies and scan angles of the mirrors 86, 90 and assist the drives 88, 92 in maintaining the rated speeds and scan angles. A crystal oscillator 102 serves as the master clock. In addition, the feedback circuits 98, 100 can be used to control the brightness of the laser spot as it traverses the screen so that uniform brightness across the screen is obtained. The time synchronizing generator 96 also controls the laser drive 84 to control when the laser 82 is energized to emit its laser beam.

The same laser 66, 82 can be used for reading and for image projection. The mirrors 70, 86 and their drives can also be shared. The Y-mirror 90 is shared only when two axis reading is desired. The controllers 80, 94 are shared.

Figure 6:
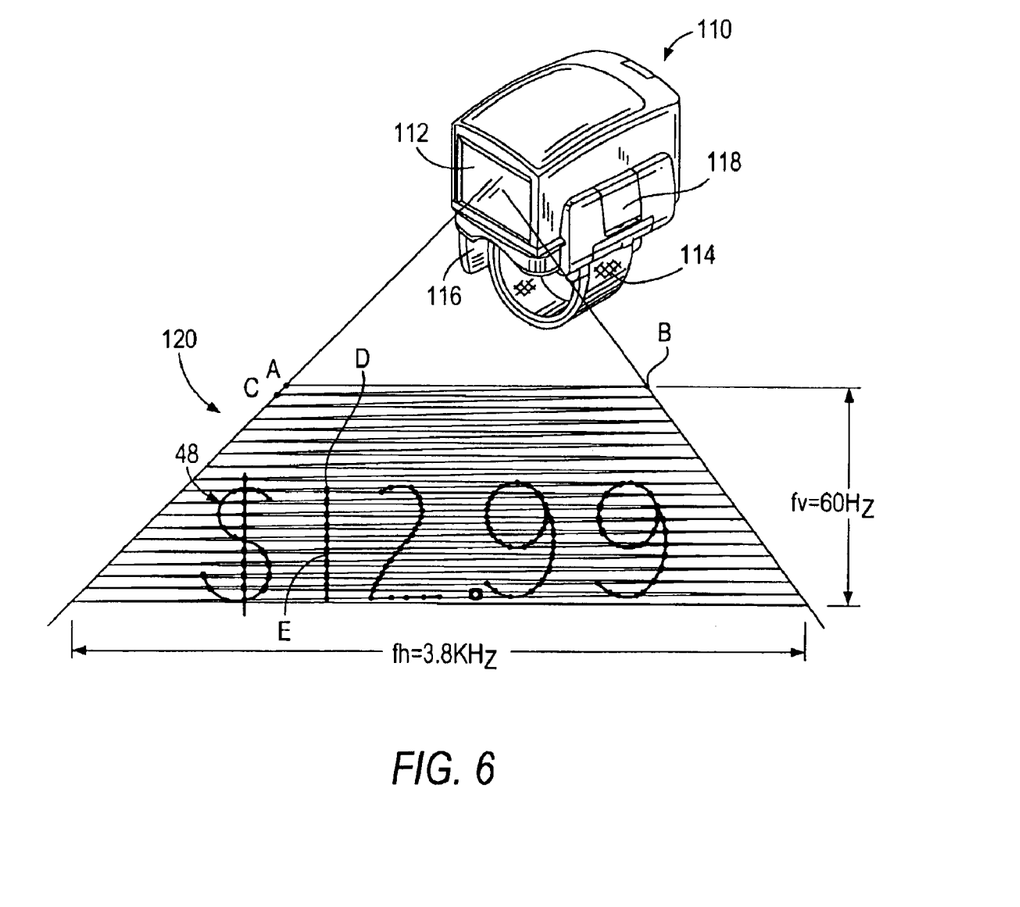
FIG. 6 is a perspective view of still another embodiment of a finger-mounted housing during image projection.

FIG. 6 depicts a modified finger-mounted housing 110, again containing the reader 60 and the projector 62 therein, and sharing as many of the components described above as possible in order to make the housing more compact and lightweight. A single window 112 is shown for both reading and image projection. A strap 114 allows the housing to be sized on one or more of the operator's fingers. A pair of triggers 116, 118 is provided to initiate different operational modes as described below.

The projector produces a resulting light pattern known as a "raster" which is identified in FIG. 6 by the reference numeral 120. Starting at point A, a spot of focused light from the laser 82 is swept by the drive 88 at the horizontal frequency along the X-direction to the point B to form a first scan line. Thereupon, the drive 92 sweeps the spot from the point B at the vertical frequency along the Y-direction to form a second scan line. The formation of successive scan lines proceeds in the same manner. In a preferred embodiment, for a display area measuring on the order of 4 square inches (e.g., 2.25 inches×1.75 inches) at a distance of about 5 inches from the window 112, the resolution of the raster is about 120 lines or pixels along the height (Y-direction) and about 64 pixels along the width (X-direction).

The image 48 is created in the raster pattern 120 by pulsing the laser 82 on and off at selected times under the control of the processor 94 and the generator 96 which, in turn, control the laser drive 84. The laser 82 produces visible light and is turned on only when a pixel in the desired image is desired to be seen. For example, the numeral "1" in the image word "$12.99" in FIG. 6 is formed by turning the laser on at pixel D in a scan line, and again at pixel E in another scan line, and so on until the vertical leg of the numeral "1" is formed.

Every letter or number can be formed by this technique. Indeed, any image, including graphical designs and logos, and even bar code symbols, can be formed from a plurality of such illuminated pixels arranged along the X- and Y- axes. Fonts can be stored in a font file 122 in memory 124 for access by the processor 94.

The image area is roughly 4 to 8 square inches to achieve a contrast ratio of around 4:1 to enable easy viewing. A larger image area would require the laser power to exceed CDRH-II safety levels if the display brightness and contrast ratio are to be maintained. Conversely, the brightness and contrast ratio are reduced for an increased display area if the laser power is kept constant.

The display area can be changed dynamically by changing the scan angles of the mirrors 86, 90, by changing the actuation power to the scan mirrors, or by slightly changing the drive frequencies. The image height is scanned at a minium of 40 Hz to reduce flicker. The X-mirror 86 is preferably a flat mirror mounted on a torsional band. The center of rotation of the mirror is symmetrical to the rotating axis to minimize audible noise. The display area is preferably rectangular.

The laser power is preferably varied with the scan speed to maintain a display of uniform visibility. The product of laser power and pixel duration should remain a constant throughout the display. The on-off duration of each spot during a scan line can be varied so that the lines resolution can be considered "infinite".

Figure 7:
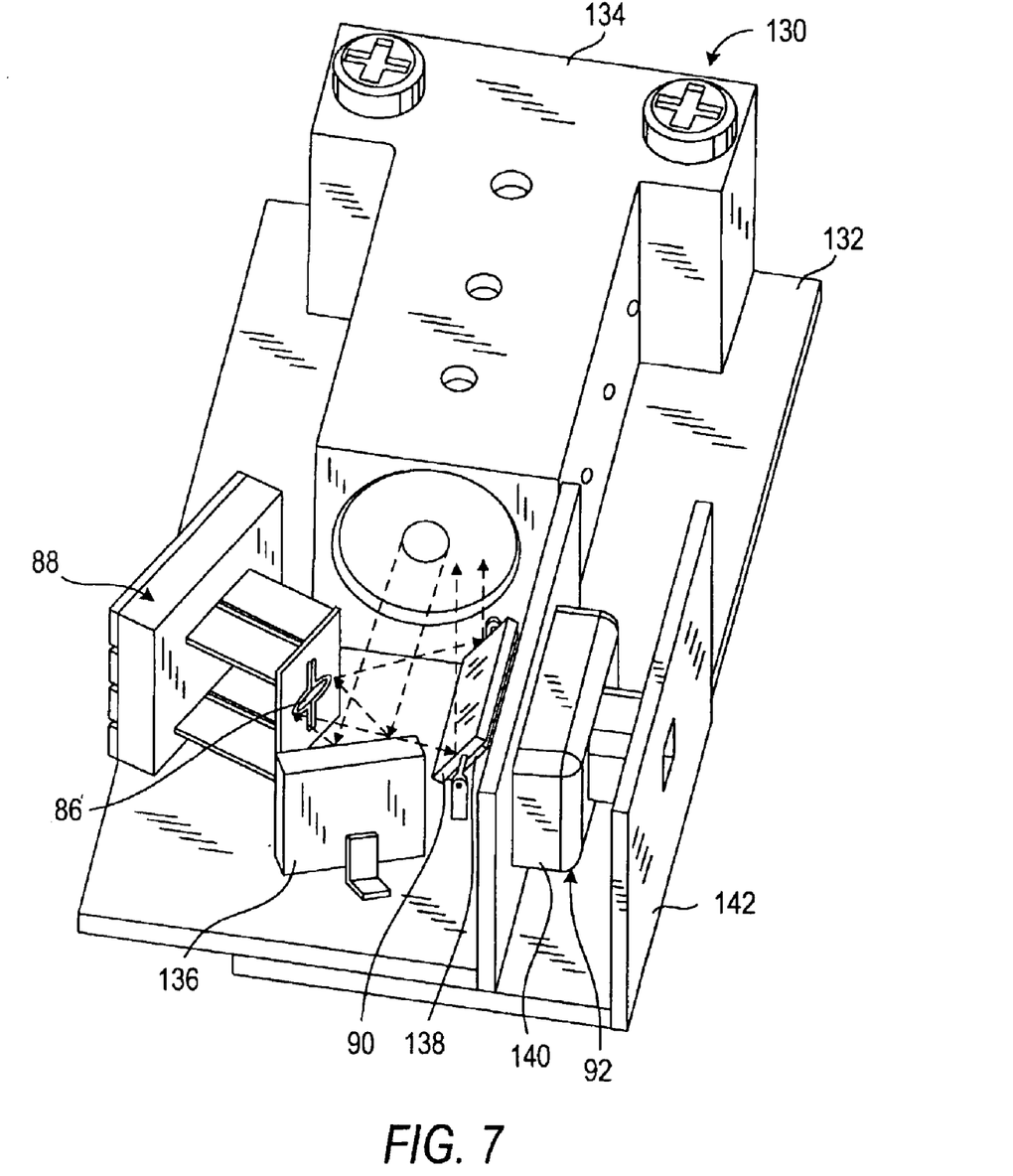
FIG. 7 is a perspective view of a module on which components of the reader and projector are mounted for installation in a housing for use in the system of FIG. 1.

The assembly can fit in a volume of about 0.5 cubic inches and, hence, can fit in a housing configured as a pen, a ring, a key chain, a pendant, or any other device having a small form factor. Preferably, the components of the assembly are mounted on a common support, such as a printed circuit board, and constitute a compact module 130 of rectangular, parallelepiped shape.

Referring to FIG. 7, the module 130 includes a support 132, for example, a printed circuit board, and a laser/optics casing 134 in which are mounted the laser 82 (see FIG. 5) and optics operative for optically modifying a laser beam emitted by the laser.

The laser beam exiting the casing 134 is directed to, and reflected off, a stationary bounce mirror 136. A scanner is also mounted on the board 132 and includes the first scan mirror 86 oscillatable by the inertial drive 88 at a first scan rate to sweep the laser beam reflected off the bounce mirror over a first horizontal scan angle, and the second scan mirror 90 oscillatable by the electromagnetic drive 92 at a second scan rate to sweep the laser beam reflected off the first scan mirror 86 over a second vertical scan angle.

The inertial drive 88 is a high-speed, low electrical power-consuming component. Details of the inertial drive can be found in U.S. patent application Ser. No. 10/387,878, filed Mar. 13, 2003, assigned to the same assignee as the instant application, and incorporated herein by reference thereto.

The electromagnetic drive 92 includes a permanent magnet 138 jointly mounted on and behind the second scan mirror 90, and an electromagnetic coil 140 operative for generating a periodic magnetic field in response to receiving a periodic drive signal. The coil 140 is adjacent the magnet 138 so that the periodic field magnetically interacts with the permanent field of the magnet 138 and causes the magnet and, in turn, the second scan mirror 90 to oscillate. The coil 140 is supported by an upright wall 142 connected to the board 132.

The inertial drive 88 oscillates the scan mirror 86 at a high speed at a scan rate preferably greater than 5 kHz and, more particularly, on the order of 18 kHz or more. This high scan rate is at an inaudible frequency, thereby minimizing noise and vibration. The electromagnetic drive 92 oscillates the scan mirror 90 at a slower scan rate on the order of 40 Hz which is fast enough to allow the image to persist on a human eye retina without excessive flicker.

The faster mirror 86 sweeps a horizontal scan line, and the slower mirror 90 sweeps the horizontal scan line vertically, thereby creating a raster pattern which is a grid or sequence of roughly parallel scan lines from which the image is constructed. Each scan line has a number of pixels. The image resolution is preferably VGA quality of 640×480 pixels. In some applications, a one-half VGA quality of 320×480 pixels, or one-fourth VGA quality of 320×240 pixels, is sufficient.

The image is constructed by selective illumination of the pixels in one or more of the scan lines. As described above, the controller 94 causes selected pixels in the raster pattern to be illuminated, and rendered visible, by the laser beam. For example, the laser drive 84 conducts an electrical current to the laser 82 to energize the latter to emit light at each selected pixel, and does not conduct an electrical current to the laser 82 to deenergize the latter to non-illuminate the other non-selected pixels. The resulting pattern of illuminated and non-illuminated pixels comprise the image 48, which can be any display of human- or machine-readable information or graphic. Instead of the laser drive 84, an acousto-optical modulator could be used to deflect the laser beam to any desired pixel in the raster pattern to illuminate the pixel, or to deflect the laser beam away from any desired pixel to non-illuminate the pixel.

The common trigger 34 can be used to initiate the reading and to control the duration of the projection display. For example, activation of the reading occurs on the initial press. By holding down the trigger, the projection is enabled until the button is released and is then re-armed for a subsequent read. By holding the trigger, the operator can shift the image 48 to any desired projection surface. Other than using a single trigger, the dual triggers 116, 118 could be independently operable, one for reading, and the other for image projection.

The data projected is designed to be relatively limited in content and programmable from the mobile terminal 12. For example, the operator may take the terminal 12 off of the belt 14 and, using a small keypad 150 and a display 152, the operator might select an option to project price, or inventory quantity. Once configured, the terminal is placed back on the belt. By limiting the amount of information displayed, it becomes more intelligible when projected on complex surfaces. Alternatively, the arrangement may incorporate switching mechanisms allowing the operator to project configuration options and to select the desired information to be displayed.

Furthermore, the size of the image is configurable. It is desirable for any form of data collection device to have a wide working range and be able to read a symbol within close proximity thereof or at a far distance therefrom. If the scan angles are constant, then the operator sees a different size image depending on the distance from the device to the projection plane. This causes the operator to move his/her hand either further from, or closer to, the projection plane to obtain a more amenable image. To provide a constant experience without such compensating hand movement, the housing can be supplemented with a ranging mechanism 154 to measure its distance from the projection plane. Based on the measured distance, the controller varies the scan angles so as to maintain a constant image size. Rather than varying the scan angles, the size of the field of view could be changed, although at the cost of poorer image resolution. The ranging mechanism 154 can be an infrared or ultrasonic rangefinder.

In order to be effective (small size, long battery life), the arrangement must take measures to reduce power consumption. Given the approximate equivalent of VGA resolution (640×480 pixels) and 8 bits/pixel for quantizing or processor packing, the complete image occupies 300 kilobytes. In conventional systems, the image would be transferred into an external memory, and then accessed by the processor from external memory. External bus devices present high capacitive loads causing CMOS based electronics to consume high levels of power. It is proposed that the exemplary embodiment of this invention use a processor with embedded DRAM. Image data captured from the reflection of the laser will be transferred to and processed directly from the embedded DRAM. The decoded image will be moved to either external memory or transferred across the wireless link to the belt-worn terminal.

In addition, the arrangement will be configurable to read either one-dimensional or two-dimensional symbols. When configured for one-dimensional barcodes, the laser's rastering is disabled and a more simplistic decode algorithm is applied, both of which reduce power consumption as compared to a two-dimensional scan.

In a minimalist configuration, the trigger 34 controls the reading and the projection of pre-configured information. It is possible that configuration can be achieved by either using a more complex switch (e.g., a scroll wheel with activation) or through a sequence of timed switch triggers. For example, the user may rapidly double-click the trigger, thereby putting the arrangement into a configuration mode. The arrangement can project a set of options, of which the top one would be highlighted. A single click can scroll down. Once the desired option is found, the operator may press and hold the trigger down to activate the desired option and return to an operational state.

It will be understood that each of the elements described above, or two or more together, also may find a useful application in other types of constructions differing from the types described above.

While the invention has been illustrated and described as embodied in an arrangement for and method of collecting and displaying information in real time along a line of sight, it is not intended to be limited to the details shown, since various modifications and structural changes may be made without departing in any way from the spirit of the present invention.

For example, rather than reading bar code symbols, the target can be equipped with a radio frequency (RF) tag or transponder electronically programmed with unique information related to the target, and an RF identification system can include a reader or interrogator configured as a handheld device. The reader typically includes an antenna or coil packaged with a transceiver (with decoder). The reader emits radio waves in range of one inch to 100 feet or more depending upon power output and frequency. When the tag passes through the zone of radio waves, it detects the reader's activation signal. The reader decodes the data encoded in the tag, and the decoded data is passed to a host for processing. The tags can be active or passive. Other types of readers could be used, such as magnetic stripe readers.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. An arrangement for collecting and automatically displaying information in real time along a line of sight from a human operator to remote targets located at variable distances therefrom, each target being identifiable by a machine-readable indicium associated therewith, the arrangement comprising:
    a) a housing aimable by the operator at the indicium of a respective target;
    b) a reader at least partly supported by the housing, for reading the indicium to obtain image data related thereto; and
    c) a projector at least partly supported by the housing, including
        i) a light source for emitting a light beam,
        ii) a scanner for sweeping the light beam in a pattern of scan lines on the respective target, each scan line having a number of pixels, and
        iii) a controller for automatically choosing selected pixels in the pattern based on the image data obtained by the reader, and for automatically causing the selected pixels to be illuminated and rendered visible by the light beam to automatically produce a two-dimensional image on the respective target adjacent the indicium associated therewith along the line of sight of the operator.

2. The arrangement of claim 1, wherein the housing is supported by a finger of the operator.

3. The arrangement of claim 1, wherein the reader generates an analog signal indicative of light of variable intensity from the indicium, and includes a processor for processing the analog signal to obtain the image data for display by the projector.

4. The arrangement of claim 1, wherein the light source is a solid-state laser.

5. The arrangement of claim 1, wherein the scanner includes a first oscillatable scan mirror for sweeping the light beam along a first direction at a first scan rate and over a first scan angle, and a second oscillatable scan mirror for sweeping the light beam along a second direction substantially perpendicular to the first direction, and at a second scan rate different from the first scan rate, and at a second scan angle different from the first scan angle.

6. The arrangement of claim 5, wherein at least one of the scan rates exceeds audible frequencies to minimize noise.

7. The arrangement of claim 1, wherein the controller includes means for energizing the light source to illuminate the selected pixels, and for deenergizing the light source to non-illuminate pixels other than the selected pixels.

8. An arrangement for collecting and displaying information in real time along a line of sight from a human operator to remote targets located at variable distances therefrom, each target being identifiable by a machine-readable indicium associated therewith, the arrangement comprising:
    a) a housing mounted on a finger of the operator and aimable by the outstretched finger of the operator at the indicium of a respective target;
    b) a reader at least partly supported by the housing, for reading the indicium to obtain image data related thereto; and
    c) a projector at least partly supported by the housing, including
        i) a light source for emitting a light beam,
        ii) a scanner for sweeping the light beam in a pattern of scan lines on the respective target, each scan line having a number of pixels, and
        iii) a controller for choosing selected pixels in the pattern based on the image data obtained by the reader, and for causing the selected pixels to be illuminated and rendered visible by the light beam to automatically produce a two-dimensional image on the respective target adjacent the indicium associated therewith along the line of sight of the operator.

9. An arrangement for collecting and displaying information in real time along a line of sight from a human operator to remote targets located at variable distances therefrom, each target being identifiable by a machine-readable indicium associated therewith, the arrangement comprising:
    a) a housing aimable by the operator at the indicium of a respective target;
    b) a reader at least partly supported by the housing, for reading the indicium to obtain image data related thereto;
    c) a projector at least partly supported by the housing, including
        i) a light source for emitting a light beam,
        ii) a scanner for sweeping the light beam in a pattern of scan lines on the respective target, each scan line having a number of pixels, and
        iii) a controller for choosing selected pixels in the pattern based on the image data obtained by the reader, and for causing the selected pixels to be illuminated and rendered visible by the light beam to produce a two-dimensional image on the respective target adjacent the indicium associated therewith along the line of sight of the operator, the image having a size extending over mutually orthogonal directions; and
    d) a rangefinder supported by the housing for determining a distance of the respective target from the housing, the rangefinder being operatively connected to the controller for controlling the size of the image based on the distance determined by the rangefinder.

10. A method of collecting and automatically displaying information in real time along a line of sight from a human operator to remote targets located at variable distances therefrom, each target being identifiable by a machine-readable indicium associated therewith, the method comprising the steps of:
    a) aiming a housing by the operator at the indicium of a respective target;
    b) reading the indicium to obtain image data related thereto by operating a reader at least partly supported by the housing; and c) automatically producing a two-dimensional image on the respective target adjacent the indicium associated therewith along the line of sight of the operator by operating a projector at least partly supported by the housing, including
 i) emitting a light beam,
 ii) sweeping the light beam in a pattern of scan lines on the respective target, each scan line having a number of pixels, and
 iii) automatically choosing selected pixels in the pattern based on the image data obtained by the reader, and automatically causing the selected pixels to be illuminated and rendered visible by the light beam.

11. The method of claim 10, and supporting the housing by a finger of the operator.

12. The method of claim 10, wherein the reader generates an analog signal indicative of light of variable intensity from the indicium, and processing the analog signal to obtain the image data for display by the projector.

13. The method of claim 10, wherein the light source is a solid-state laser.

14. The method of claim 10, wherein the scanner includes a first oscillatable scan mirror for sweeping the light beam along a first direction at a first scan rate and over a first scan angle, and a second oscillatable scan mirror for sweeping the light beam along a second direction substantially perpendicular to the first direction, and at a second scan rate different from the first scan rate, and at a second scan angle different from the first scan angle.

15. The method of claim 14, wherein at least one of the scan rates exceeds audible frequencies to minimize noise.

16. The method of claim 10, and the steps of energizing the light source to illuminate the selected pixels, and deenergizing the light source to non-illuminate pixels other than the selected pixels.

17. The method of claim 10, and the steps of determining a distance of the respective target from the housing, and of controlling a size of the image based on the determined distance.

* * * * *